United States Patent

Miller

Patent Number: 5,685,586
Date of Patent: Nov. 11, 1997

[54] METHOD OF USING A TOOL FOR FASTENING A SEAT BELT

[76] Inventor: Dale D. Miller, 4801 Indigo Dr., Wausau, Wis. 54401

[21] Appl. No.: 640,599

[22] Filed: May 1, 1996

[51] Int. Cl.⁶ ................................................. B25J 1/12
[52] U.S. Cl. .................... 294/24; 294/19.1; 294/26; 81/487; 362/120; 362/253
[58] Field of Search .................... 294/1.1, 2, 19.1, 294/24, 26, 3.6; 81/487, 488; 15/105; 362/102, 109, 119, 120, 253

[56] References Cited

U.S. PATENT DOCUMENTS

| | | | |
|---|---|---|---|
| 5,003,437 | 3/1991 | Barrett | 294/19.1 |
| 5,060,995 | 10/1991 | Goldstein et al. | 294/19.1 |
| 5,197,176 | 3/1993 | Reese | 294/26 |
| 5,344,201 | 9/1994 | Offin | 294/19.1 |
| 5,347,439 | 9/1994 | Warren | 294/24 |
| 5,496,083 | 3/1996 | Shouse, Jr. | 294/19.1 |

*Primary Examiner*—Dean Kramer
*Attorney, Agent, or Firm*—Andrus, Sceales, Starke & Sawall

[57] ABSTRACT

A tool to assist in the fastening of a seat belt buckle having an elongated, rigid body, a hook extension extending longitudinally from a front end of the body about 1 inch, and a curved hook which extends from the hook extension and curves towards the front end of the tool body. The tool body is preferably about 16 inches in length. The hook/hook extension may be mounted to the body with a hinge. A flashlight may be included within the tool body. An occupant in a vehicle uses the tool by engaging the hook through an opening in the male metal part of a seat belt buckle, and pulls the male part of the buckle and the belt across their body using the tool. With the male part of the buckle in front of the occupant, the occupant can easily engage the male part of the buckle into the female part of the buckle. The tool makes it easier for an occupant of a vehicle to retrieve the male part of a seat belt buckle, and therefore encourages the use of seat belts.

8 Claims, 2 Drawing Sheets

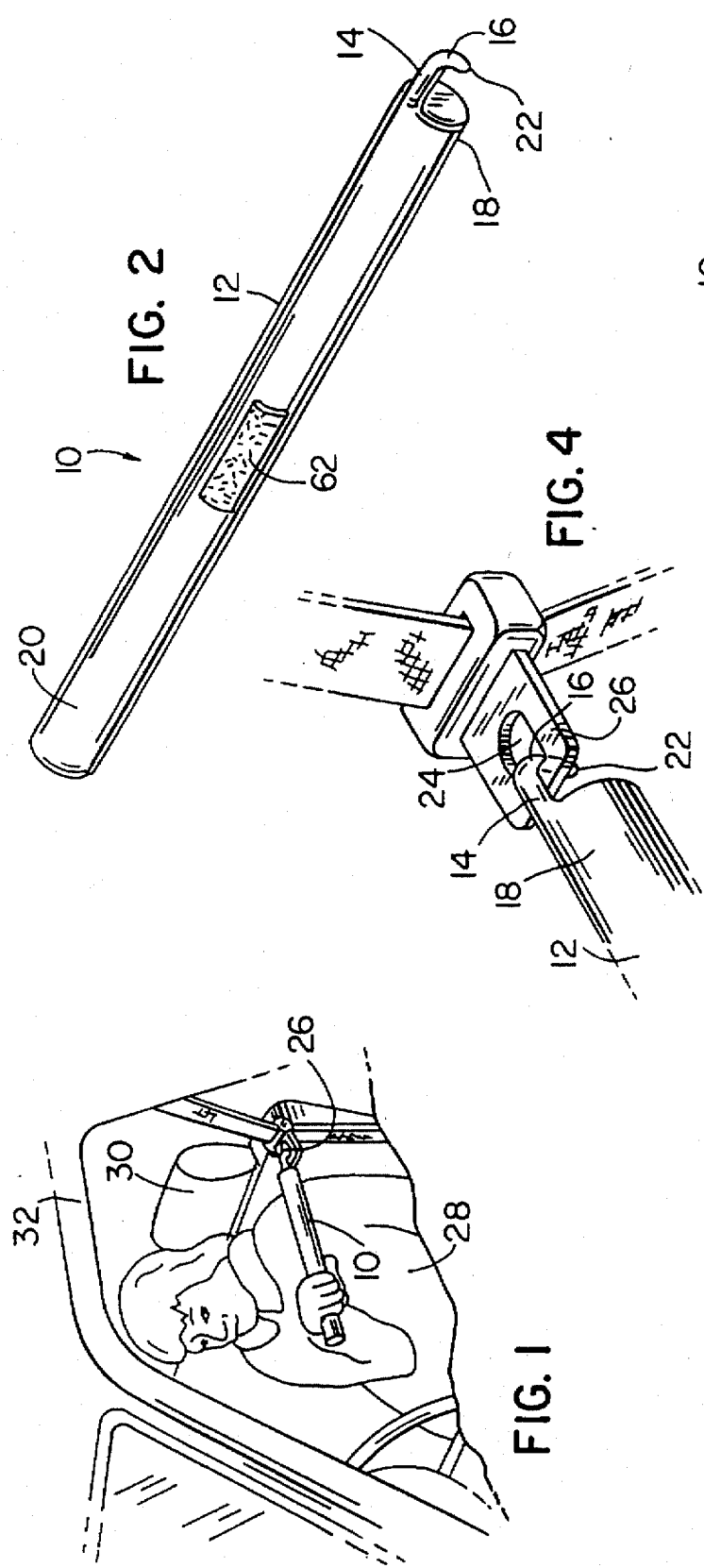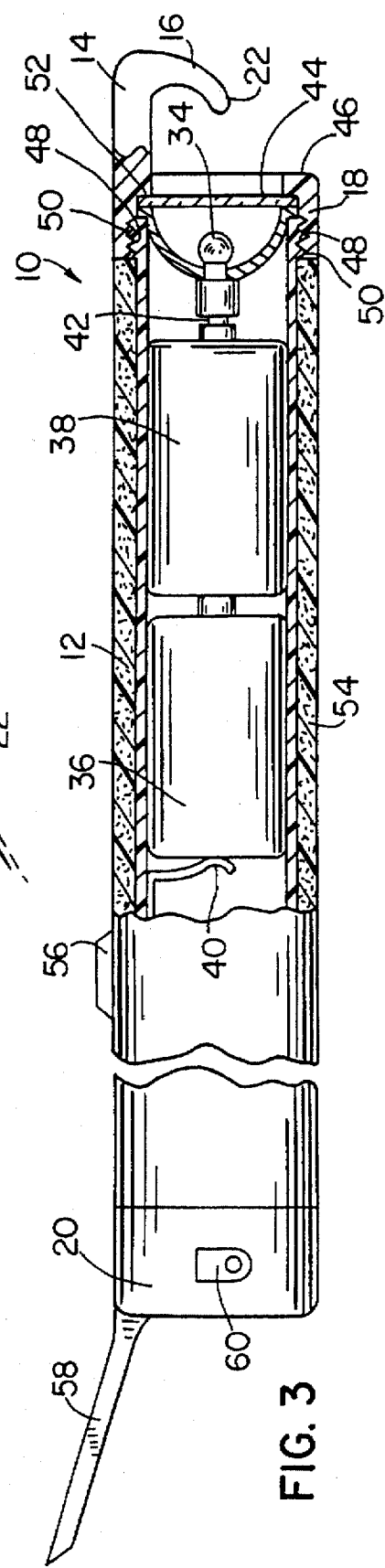

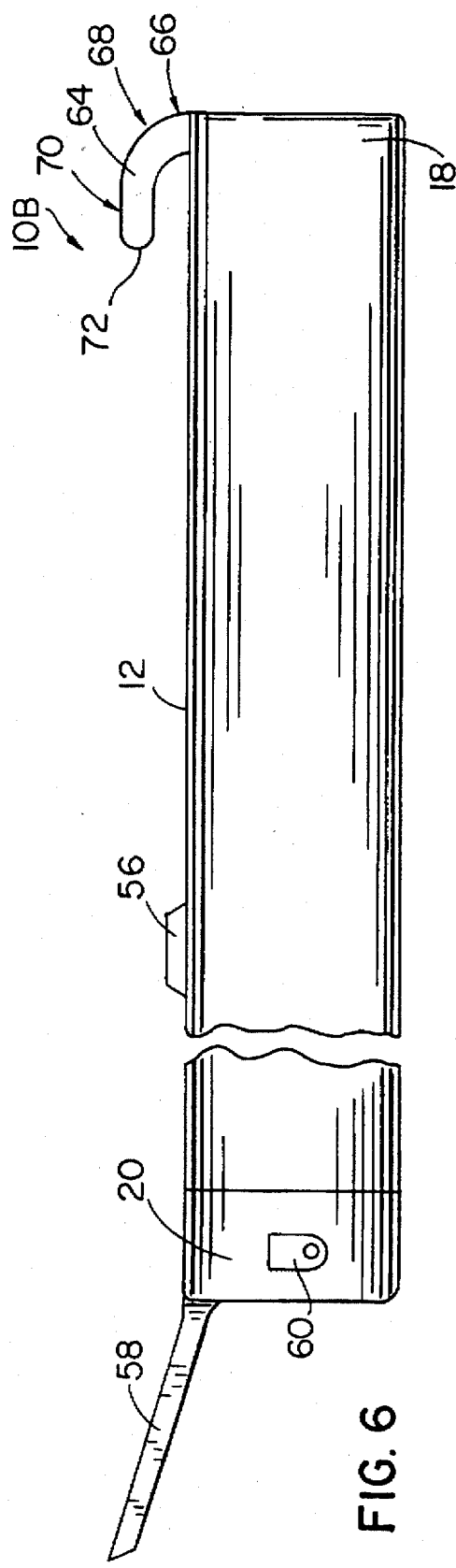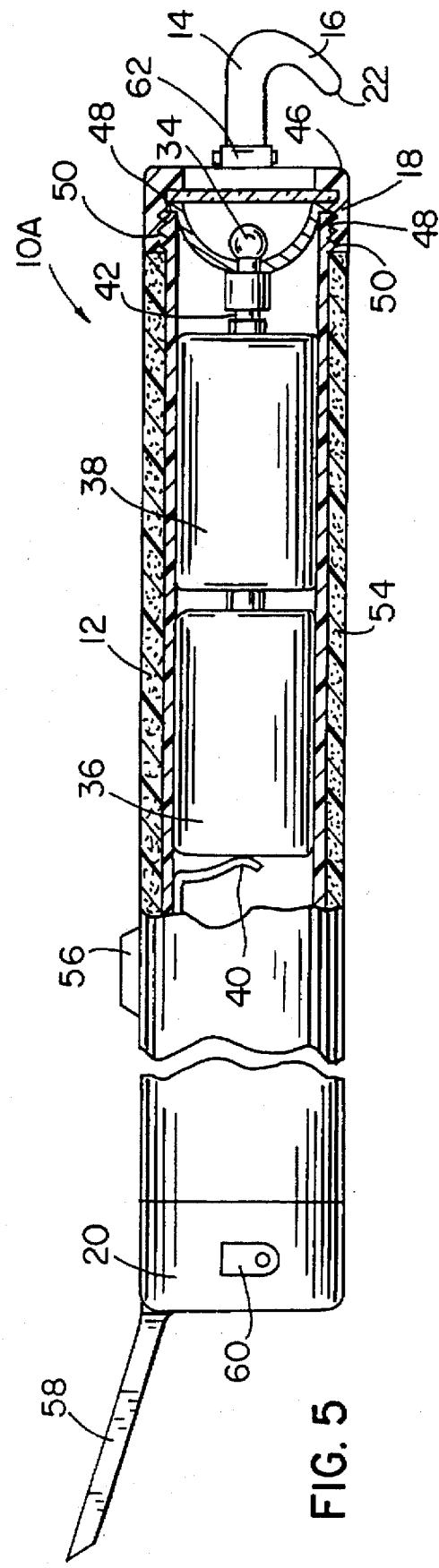

METHOD OF USING A TOOL FOR FASTENING A SEAT BELT

FIELD OF THE INVENTION

The invention relates to a tool to assist in the fastening of a vehicle seat belt, and a method of using the same.

BACKGROUND OF THE INVENTION

Many people, young and old, decide to not wear seat belts, often because it is inconvenient to locate or reach the metal male part of the seat belt buckle. Buckling seat belts can be especially inconvenient or troublesome to people who are injured or disabled, or even for people wearing bulky clothes. In addition, many people become frustrated even after they have turned and pulled on the metal male part of the seat belt buckle when it turns out they cannot locate and engage the female part of the buckle. These problems usually become worse in the dark. Oftentimes, an occupant in a vehicle will fumble with the buckle unsuccessfully, eventually grow frustrated and decide to drive off without having buckled the seat belt. It is not uncommon for the occupant to try to buckle the seat belt again after the vehicle is moving.

The invention is designed to encourage motor vehicle occupants to buckle their seat belts before the vehicle is moving.

SUMMARY OF THE INVENTION

In one aspect, the invention is an elongated, rigid tool having a hook located near the front end of the tool, or forward of the front end of the tool. The tool is configured so a vehicle occupant can hold the body of the tool in their hand and place the hook on the tool through an opening common in the metal male part of many seat belt buckles. The opening in the male part of the buckle is provided so that the male part of the buckle can latch securely in the female part of the buckle when the male and female parts are engaged. Once the hook is engaged in the male part of the buckle, the tool is used to pull the belt and the male part of the buckle across and in front of the occupant. When the male part of the buckle is in front of the occupant in the occupant's lap, the occupant can grab the belt and the male part of the buckle with their empty hand and remove the hook from the opening in the male part of the buckle. Then, the occupant can continue to pull the male part of the buckle towards the female part of the buckle to engage the male part into the female part of the buckle.

The tool has a body that is preferably straight and elongated. In one embodiment, a hook extension projects longitudinally forward from a front end of the rigid body in a direction generally parallel to the body. The longitudinal hook extension is preferably about 1 inch long. A hook, which is preferably curved, is integral with the hook extension. The curved hook is generally perpendicular to the hook extension when the curved hook starts to extend from the hook extension, but curves increasingly closer to the front end of the rigid body as the hook extends further away from the longitudinal extension. The free end of the curved hook is blunt.

Using a curved hook is advantageous because the curve in the hook prevents the male part of the buckle from inadvertently releasing from the hook even when the tool is used in awkward orientations. The hook is preferably tapered so that the cross-sectional area of the hook gradually reduces as the hook extends away from the hook extension. The taper is preferred so that the strength of the hook can be optimized without compromising the ability of the tip of the hook to capture the opening in the male part of the buckle.

In another embodiment, a tight hinge is mounted to the front end of the rigid body, and the hook extension/hook are attached to the hinge. The hinge allows the hook to be folded for storage, or put in a custom position for the user.

Another embodiment of the invention eliminates the hook extension that projects forward from the front end of the rigid body. In this embodiment of the invention, the hook itself is attached to the rigid body towards the front of the body. The hook projects outwardly from the tool body and curves rearwardly. As in the previous embodiments, the free end of the hook is blunt.

In another aspect of the invention, the tool includes a light such as a flashlight. In this embodiment of the invention, the body is adapted to receive one or more batteries and an electric light. The electric light receives electrical power from the one or more batteries and illuminates light forward of the tool through a light cover attached to the front end of the body. The light facilitates use of the tool when it is dark. In addition, the light can be used as a flashlight for other reasons in the vehicle, such as locating an ignition key hole, etc. In flashlight embodiments of the invention, it is preferred that the front end of the rigid body comprise a removable cap having threads which attach to corresponding threads on the body. The cap preferably has an internal notch to receive a peripheral edge of the light cover and secure the light cover within the rigid body when the cap is screwed onto the body. It is preferred that the light cover be recessed from the front end of the body to protect the light cover from repeatedly impacting the metal male part of the buckle.

In cold climates it may be desired to provide an ice scraper on the rear end of the tool.

For repeated users, it has been found that the invention promotes a convenient routine which encourages the use of seat belts. Using the invention, it is typically no more difficult to retrieve the metal male portion of the buckle if it has fallen down towards the floor of the vehicle than when it remains at shoulder height. Further, the light allows the user to identify the location of either the male or the female parts of the buckle when it is dark or when the parts are located in hard to find places.

Other features and advantages of the invention may be apparent upon reviewing the drawings and the following description thereof.

BRIEF DESCRIPTION OF THE DRAWINGS

FIG. 1 is a schematic view illustrating a vehicle occupant using the invention.

FIG. 2 is a perspective view showing a first embodiment of the invention.

FIG. 3 is a side elevational view with parts broken away showing a second embodiment of the invention.

FIG. 4 is a view showing how the invention hooks an opening in a metal male part of a seat belt buckle.

FIG. 5 is a side elevational view with parts broken away showing a third embodiment of the invention.

FIG. 6 is a side elevational view showing a fourth embodiment of the invention.

DETAILED DESCRIPTION OF THE DRAWINGS

FIG. 2 illustrates a first embodiment of the tool 10 for fastening a seat belt buckle in accordance with the invention.

The tool 10 consists of an elongated tubular body 12, a hook extension 14, and a hook 16. The body 12 is straight and rigid. The body 12 has a front end 18 and a rear end 20. The length of the body is preferably 16 inches, but should be no less than 8 to 10 inches to carry out the invention.

In FIG. 2, it is preferred that the hook extension 14 and the hook 16 be molded integrally with the body portion 12 of the tool 10. It is preferred that the tool 10 be molded plastic.

The hook extension 14 projects longitudinally outward from the front end 18 of the rigid body 12 in a direction generally parallel to the rigid body 12, preferably about 1 inch beyond the front end 18 of the body 12. The drawings show the hook extension 14 projecting from the top of the front end 18 of the body 12, however, the extension 14 can be located to project from the bottom, side or middle of the from end 18 of the body 12. The hook 16 extends generally downward from the hook extension 14 as depicted in FIG. 2. The hook 16 is preferably curved. The hook is generally perpendicular to the longitudinal hook extension 14 when the hook starts to extend downward from the hook extension 14. As the hook 16 continues to extend downward, the hook curves increasingly closer to the front end 18 of the body 12. The inwardly curved hook 16 effectively retains the metal male portion 26 of the buckle even when the tool 10 is in an awkward orientation. The hook 16 has a free end 22 that is blunt. The hook 16 also has a cross-sectional area that gradually reduces as the hook 16 extends downward from the hook extension 14. In this manner, the free end 22 of the hook 16 can be made small enough to easily engage a hole in a metal male part 26 of a seat belt buckle, while at the same time maintaining a sufficient strength for the hook 16.

Referring to FIGS. 1 and 4, an occupant 28 in the driver's seat 30 of a vehicle 32 can use the tool 10 to assist in retrieving the metal male part 26 of a seat belt buckle. As shown best in FIG. 4, the hook 16 engages the metal male part 26 of the seat belt buckle through opening 24. It has been found that providing a 1 inch hook extension 14 allows a suitable amount of clearance when the hook 16 engages the opening 24 in most of the male metal parts of the belt buckles on the market.

FIG. 3 shows a second embodiment of the invention in which the tool 10 includes a flashlight 34. In FIG. 3, the body 12 of the tool 10 is adapted to receive two batteries 36 and 38. The batteries 36 and 38 are preferably size C batteries, but can be smaller. If a smaller size battery is used, the diameter of the body 12 can be reduced. The batteries 36, 38 provide electrical power via electrical connections 40 and 42 to the electric light 34. Although the batteries 36 and 38 depicted in FIG. 3 are disposable batteries, rechargeable batteries or the like, such as a rechargeable power pack can be used.

The electric light 34 is located within the body 12 forward of the batteries 36 and 38. The electric light 34 illuminates light forward of the tool 10 through a light cover 44 which is attached to the front end 18 of the tool 10. The light cover 44 is recessed inward from the front surface 46 of the front end preferably about ¼ of an inch. By recessing the light cover 44, the cover 44 is protected from repeated impact from the male metal part 26 of the seat belt buckle.

In FIG. 3, the front end 18 of the tool 10 is a removable cap having threads 48 which can be screwed onto corresponding threads 50 on the body 12 to attach the cap 18 to the body 12. The cap 18 includes a circumferential step 52 slightly forward of the threads 48 on the cap 18. A notch is formed between the threaded portion 50 of the body 12 and the step 52 of the cap 18. The flashlight 34 and the light cover 44 are secured in the peripheral notch when the cap 18 is screwed onto the body 12.

In FIG. 3, the body 12 has a foam layer 54 around most of the body 12. It is not necessary to provide a foam layer 54 around the body 12 of the tool 10, however, the foam layer provides a non-slip material which may be useful to the user. Alternatively, a non-slip surface can be molded directly into the body 12.

A light switch 56 is provided on the body 12 to turn the flashlight 34 on and off. An ice scraper 58 can be attached to the rear end 20 of the tool. Likewise, an ice scraper, such as ice scraper 58, can be attached with the rear end 20 of the tool 10 shown in FIG. 2.

In FIG. 3, it is preferred that the hook extension 14 and the hook 16 be integrally molded with the replaceable cap 18, and that the ice scraper 58 be integrally molded with the rear end 20 of the tool 10.

The tool 10 can include an eyelet 60 to facilitate the use of a chain for easy storage within the vehicle 32. Alternatively, a strip of VELCRO 62 such as shown in FIG. 2 can be used to facilitate storage of the tool 10.

To use the tool 10, an occupant 28 sitting in the driver's seat 30 grips the tool 10 preferably with the right hand as shown in FIG. 1. The occupant 28 then places the hook 16 through the opening 24 in the male part 26 of the seat belt buckle. The occupant 28 pulls the male part 26 of the seat belt buckle in front of themselves towards the female part of the seat belt buckle by pulling the tool 10 across their body. Then, the occupant 28 grabs the male part 26 of the seat belt buckle or the adjacent seat belt with their left hand which is free from the tool 10, and frees the tool hook 16 from the opening 24 in the male part 26 of the seat belt buckle. The occupant 28 can then store the tool and reach for the female part of the seat belt buckle with their right hand. The occupant then engages the male part of the seat belt buckle in the female part of the seat belt buckle.

If the tool 10 includes a light 34, the occupant 28 may desire to use the light 34 to locate the male part 26 of the seat belt buckle before placing the hook 16 through the opening 24 in the male part of the buckle. Also, the occupant 28 may desire to use the light 34 to locate the female part of the buckle before reaching for the part with their right hand. The light 34 can also be used for additional purposes inside the vehicle 32, such as locating the ignition key hole when it is dark.

An occupant sitting in the passenger's seat would use the tool 10 in the same manner, but the occupant in the passenger's seat would initially grip the tool 10 with their left hand.

FIG. 5 shows another embodiment of the invention that is similar to the embodiment of the invention shown in FIG. 3, except that the hook extension 14 and the hook 16 are attached to the front end 18 of the body 12 with a hinge 62. Also, the base of the hook extension 14 has been moved to a midpoint location on the front surface 46 of the front end 18. It is preferred that the hinge 62 be tight so that the hook 16 and hook extension 14 do not move relative to the body 12 without a significant lateral force applied to the hook 16 and/or the hook extension 14.

FIG. 6 illustrates another embodiment of the invention that eliminates the need for a hook extension 14 that projects longitudinally forward from the front end 18 of the elongated body 12. In FIG. 6, a hook 64 is attached to the front end 18 of the body 12. The hook 64 extends generally radially from the body 18 when the hook 64 begins to extend away from the body 12 as depicted by reference numeral 66. As the hook 64 continues to extend from the body 12, the hook 64 curves rearward in the area shown by reference numeral 68. The hook 64 continues to curve rearward until the hook 64 is generally parallel with the body 12. The hook 64 continues to extend generally parallel to the body 12 for a short distance as depicted by reference numeral 70. The hook 64 has a free end 72 that is blunt. The hook 64 preferably has a cross-sectional area that gradually reduces as the hook 64 extends away from the body 12. Thus, the free end 72 of the hook 64 can be made small enough to easily engage a hole in a male part 26 of a seat belt buckle, while at the same time maintaining a sufficient strength for the hook 64.

Various modifications and equivalents of the invention as described above may be apparent to those skilled in the art, and such modifications and equivalents should be considered to come within the scope of the following claims.

I claim:

1. A method of fastening a seat belt in a vehicle comprising the steps of:

gripping an elongated, rigid tool having a hook extension and a hook integral with the hook extension, the hook extension projecting longitudinally forward from the front end of the tool in a direction generally parallel to the rigid tool and the hook extending generally perpendicular to the longitudinal hook extension when the hook starts to extend away from the hook extension and extending increasingly closer to the front end of the tool as the hook extends further away from the hook extension;

placing the hook on the tool through an opening located in a metal male part of a seat belt buckle in a vehicle;

pulling the metal male part of the seat belt buckle towards the female part of the seat belt buckle by pulling the tool towards the female part of the seat belt buckle in front of an occupant in the vehicle;

grabbing the male metal part of the seat belt buckle with a free hand when the male metal part of the seat belt buckle is in front of the occupant;

freeing the tool hook from the opening in the male metal part of the seat belt buckle; and engaging the male metal part of the seat belt buckle into the female part of the seat belt buckle;

wherein the tool includes a light and the method further comprises the step of using the light to locate the metal male part of the seat belt buckle before placing the hook on the tool through the opening located in the metal male part of the seat belt buckle.

2. A method of fastening a seat belt in a vehicle comprising the steps of:

gripping an elongated, rigid tool having a hook extension and a hook integral with the hook extension, the hook extension projecting longitudinally forward from the front end of the tool in a direction generally parallel to the rigid tool and the hook extending generally perpendicular to the longitudinal hook extension when the hook starts to extend away from the hook extension and extending increasingly closer to the front end of the tool as the hook extends further away from the hook extension;

placing the hook on the tool through an opening located in a metal male part of a seat belt buckle in a vehicle;

pulling the metal male part of the seat belt buckle towards the female part of the seat belt buckle by pulling the tool towards the female part of the seat belt buckle in front of an occupant in the vehicle;

grabbing the male metal part of the seat belt buckle with a free hand when the male metal part of the seat belt buckle is in front of the occupant;

freeing the tool hook from the opening in the male metal part of the seat belt buckle; and engaging the male metal part of the seat belt buckle into the female part of the seat belt buckle;

wherein the tool includes a light and the method further comprises the step of using the light to locate the female part of the seat belt buckle before engaging the male metal part of the seat belt buckle into the female part of the seat belt buckle.

3. A method of fastening a seat belt in a vehicle comprising the steps of:

gripping an elongated, rigid tool having a hook extension and a hook integral with the hook extension, the hook extension projecting longitudinally forward from the front end of the tool in a direction generally parallel to the rigid tool and the hook extending generally perpendicular to the longitudinal hook extension when the hook starts to extend away from the hook extension and extending increasingly closer to the front end of the tool as the hook extends further away from the hook extension;

placing the hook on the tool through an opening located in a metal male part of a seat belt buckle in a vehicle;

pulling the metal male part of the seat belt buckle towards the female part of the seat belt buckle by pulling the tool towards the female part of the seat belt buckle in front of an occupant in the vehicle;

grabbing the male metal part of the seat belt buckle with a free hand when the male metal part of the seat belt buckle is in front of the occupant;

freeing the tool hook from the opening in the male metal part of the seat belt buckle; and engaging the male metal part of the seat belt buckle into the female part of the seat belt buckle;

wherein the occupant fastening the seat belt is located in a left hand driver side seat of a vehicle and wherein:

the occupant grips the elongated, rigid tool with their right hand; and after placing the hook on the tool through the opening located in the male metal part of the seat belt buckle and pulling the male metal part of the seat belt buckle in front of the occupant uses their left hand to grab that male metal part of the seat belt buckle so that the tool hook can be freed from the opening in the male metal part of the seat belt buckle.

4. A method of fastening a seat belt in a vehicle comprising the steps of:

gripping an elongated, rigid tool having a hook extension and a hook integral with the hook extension, the hook extension projecting longitudinally forward from the front end of the tool in a direction generally parallel to the rigid tool and the hook extending generally perpendicular to the longitudinal hook extension when the hook starts to extend away from the hook extension and extending increasingly closer to the front end of the tool as the hook extends further away from the hook extension;

placing the hook on the tool through an opening located in a metal male part of a seat belt buckle in a vehicle;

pulling the metal male part of the seat belt buckle towards the female part of the seat belt buckle by pulling the tool towards the female part of the seat belt buckle in front of an occupant in the vehicle;

grabbing the male metal part of the seat belt buckle with a free hand when the male metal part of the seat belt buckle is in front of the occupant;

freeing the tool hook from the opening in the male metal part of the seat belt buckle; and engaging the male metal part of the seat belt buckle into the female part of the seat belt buckle;

wherein the occupant fastening the seat belt is located in a right hand passenger side seat of a vehicle and wherein:

the occupant grips the elongated, rigid tool with their left hand; and after placing the hook on the tool through the hole located in the male metal part of the seat belt buckle and pulling the male metal part of the seat belt buckle in front of the occupant uses their left hand to grab the male metal part of the seat belt buckle so that the tool hook can be freed from the opening in the male metal part of the seat belt buckle.

5. A method of fastening a seat belt in a vehicle comprising the steps of:

gripping an elongated, rigid body have a front end and a rear end and a hook attached to the front end of the body, the hook extending generally away from the body as the hook starts to extend rearward from the front end of the body;

placing the hook on the tool through an opening located in a metal male part of a seat belt buckle in a vehicle;

pulling the metal male part of the seat belt buckle towards the female part of the seat belt buckle by pulling the tool towards the female part of the seat belt buckle in front of an occupant in the vehicle;

grabbing the male metal part of the seat belt buckle with a free hand when the male metal part of the seat belt buckle is in front of the occupant;

freeing the tool hook from the opening in the male metal part of the seat belt buckle; and engaging the male metal part of the seat belt buckle into the female part of the seat belt buckle;

wherein the tool includes a light and the method further comprises the step of using the light to locate the metal male part of the seat belt buckle before placing the hook on the tool through the opening located in the metal male part of the seat belt buckle.

6. A method of fastening a seat belt in a vehicle comprising the steps of:

gripping an elongated, rigid body have a front end and a rear end and a hook attached to the front end of the body, the hook extending generally away from the body as the hook starts to extend rearward from the front end of the body;

placing the hook on the tool through an opening located in a metal male part of a seat belt buckle in a vehicle;

pulling the metal male part of the seat belt buckle towards the female part of the seat belt buckle by pulling the tool towards the female part of the seat belt buckle in front of an occupant in the vehicle;

grabbing the male metal part of the seat belt buckle with a free hand when the male metal part of the seat belt buckle is in front of the occupant;

freeing the tool hook from the opening in the male metal part of the seat belt buckle; and engaging the male metal part of the seat belt buckle into the female part of the seat belt buckle;

wherein the tool includes a light and the method further comprises the step of using the light to locate the female part of the seat belt buckle before engaging the male metal part of the seat belt buckle into the female part of the seat belt buckle.

7. A method of fastening a seat belt in a vehicle comprising the steps of:

gripping an elongated, rigid body have a front end and a rear end and a hook attached to the front end of the body, the hook extending generally away from the body as the hook starts to extend rearward from the front end of the body;

placing the hook on the tool through an opening located in a metal male part of a seat belt buckle in a vehicle;

pulling the metal male part of the seat belt buckle towards the female part of the seat belt buckle by pulling the tool towards the female part of the seat belt buckle in front of an occupant in the vehicle;

grabbing the male metal part of the seat belt buckle with a free hand when the male metal part of the seat belt buckle is in front of the occupant;

freeing the tool hook from the opening in the male metal part of the seat belt buckle; and engaging the male metal part of the seat belt buckle into the female part of the seat belt buckle;

wherein the occupant fastening the seat belt is located in a left hand driver side seat of a vehicle and wherein:

the occupant grips the elongated, rigid tool with their right hand; and after placing the hook on the tool through the opening located in the male metal part of the seat belt buckle and pulling the male metal part of the seat belt buckle in front of the occupant uses their left hand to grab the male metal part of the seat belt buckle so that the tool hook can be freed from the opening in the male metal part of the seat belt buckle.

8. A method of fastening a seat belt in a vehicle comprising the steps of:

gripping an elongated, rigid body have a front end and a rear end and a hook attached to the front end of the body, the hook extending generally away from the body as the hook starts to extend rearward from the front end of the body;

placing the hook on the tool through an opening located in a metal male part of a seat belt buckle in a vehicle;

pulling the metal male part of the seat belt buckle towards the female part of the seat belt buckle by pulling the tool towards the female part of the seat belt buckle in front of an occupant in the vehicle;

grabbing the male metal part of the seat belt buckle with a free hand when the male metal part of the seat belt buckle is in front of the occupant;

freeing the tool hook from the opening in the male metal part of the seat belt buckle; and engaging the male metal part of the seat belt buckle into the female part of the seat belt buckle;

wherein the occupant fastening the seat belt is located in a right hand passenger side seat of a vehicle and wherein:

the occupant grips the elongated, rigid tool with their left hand; and after placing the hook on the tool through the hole located in the male metal part of the seat belt buckle and pulling the male metal part of the seat belt buckle in front of the occupant uses their left hand to grab the male metal part of the seat belt buckle so that the tool hook can be freed from the opening in the male metal part of the seat belt buckle.

* * * * *